United States Patent
Ter Haar et al.

(10) Patent No.: US 11,582,383 B2
(45) Date of Patent: Feb. 14, 2023

(54) OBTAINING IMAGE DATA OF AN OBJECT IN A SCENE

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Frank Ter Haar, Woerden (NL); Nanda van der Stap, The Hague (NL); Hans Maarten Stokking, Wateringen (NL); Martin Prins, The Hague (NL); Simon Gunkel, Duivendrecht (NL)

(73) Assignees: KONINKLIJKE KPN N.V., Rotterdam (NL); NEDERLANDSE ORGANISATIE VOOR TOEGEPAST-NATUURWETEN-SCHAPPELIJK ONDERZOEK TNO, 'S-Gravenhage (NL)

( * ) Notice: Subject to any disclaimer, the term of this patent is extended or adjusted under 35 U.S.C. 154(b) by 244 days.

(21) Appl. No.: 16/760,883

(22) PCT Filed: Nov. 9, 2018

(86) PCT No.: PCT/EP2018/080713
§ 371 (c)(1),
(2) Date: Apr. 30, 2020

(87) PCT Pub. No.: WO2019/092161
PCT Pub. Date: May 16, 2019

(65) Prior Publication Data
US 2021/0112193 A1    Apr. 15, 2021

(30) Foreign Application Priority Data
Nov. 10, 2017 (EP) ................................ 17201151

(51) Int. Cl.
*H04N 5/232* (2006.01)
*G06T 7/50* (2017.01)
(Continued)

(52) U.S. Cl.
CPC .......... *H04N 5/23218* (2018.08); *G06T 7/20* (2013.01); *G06T 7/50* (2017.01); *G06T 7/70* (2017.01);
(Continued)

(58) Field of Classification Search
CPC ............. H04N 5/23218; H04N 5/2226; H04N 5/23254; H04N 5/341; G06T 7/20; G06T 7/50; G06T 7/70; G06V 10/25
See application file for complete search history.

(56) References Cited

U.S. PATENT DOCUMENTS 8,401,225 B2 *  3/2013  Newcombe ............. G06T 7/215
                                                         382/100
8,570,320 B2 * 10/2013  Izadi ....................... G06T 17/00
                                                         345/420

(Continued)

FOREIGN PATENT DOCUMENTS

CN        105590312 A      5/2016
WO   WO 2017/103065 A1    6/2017
WO   WO 2019/092161 A1    5/2019

OTHER PUBLICATIONS

European Search Report for European Application No. EP 17201151. 2, titled: Obtaining Image Data Of An Object In A Scene; dated: May 24, 2018.

(Continued)

*Primary Examiner* — Lin Ye
*Assistant Examiner* — John H Morehead, III
(74) *Attorney, Agent, or Firm* — Hamilton, Brook, Smith & Reynolds, P.C.

(57) ABSTRACT

A method and processor system are provided which analyze a depth map, which may be obtained from a range sensor (Continued)

capturing depth information of a scene, to identify where an object is located in the scene. Accordingly, a region of interest may be identified in the scene which includes the object, and image data may be selectively obtained of the region of interest, rather than of the entire scene containing the object. This image data may be acquired by an image sensor configured for capturing visible light information of the scene. By only selectively obtaining the image data within the region of interest, rather than all of the image data, improvements may be realized in the computational complexity of a possible further processing of the image data, the storage of the image data and/or the transmission of the image data.

26 Claims, 9 Drawing Sheets

(51) Int. Cl.
  *G06T 7/70*   (2017.01)
  *G06T 7/20*   (2017.01)
  *H04N 5/222*  (2006.01)
  *G06V 10/25*  (2022.01)
(52) U.S. Cl.
  CPC ........... *G06V 10/25* (2022.01); *H04N 5/2226* (2013.01); *H04N 5/23254* (2013.01)

(56) References Cited

U.S. PATENT DOCUMENTS

| | | | |
|---|---|---|---|
| 8,702,000 | B2 | 4/2014 | Barber et al. |
| 9,552,655 | B2* | 1/2017 | Freeman ................. G06T 7/194 |
| 10,623,468 | B1 | 4/2020 | Rappaport |
| 11,089,214 | B2 | 8/2021 | Stokking |
| 2010/0214419 | A1 | 8/2010 | Kaheel et al. |
| 2011/0211754 | A1 | 9/2011 | Litvak et al. |
| 2011/0255589 | A1 | 10/2011 | Saunders |
| 2012/0016680 | A1 | 1/2012 | Thesing |
| 2012/0050524 | A1 | 3/2012 | Rinner et al. |
| 2012/0060077 | A1 | 3/2012 | Mate et al. |
| 2012/0195471 | A1 | 8/2012 | Newcomb et al. |
| 2014/0254919 | A1 | 9/2014 | Sun et al. |
| 2014/0307775 | A1 | 10/2014 | Ouedraogo et al. |
| 2015/0269739 | A1* | 9/2015 | Ho ........................... G06T 7/285 |
| | | | 382/164 |
| 2016/0104031 | A1* | 4/2016 | Shotton ..................... G06T 7/11 |
| | | | 382/154 |
| 2016/0241776 | A1* | 8/2016 | Kim ................. H04N 5/232945 |
| 2016/0314557 | A1 | 10/2016 | Croxford |
| 2017/0124717 | A1* | 5/2017 | Baruch ..................... G06T 7/50 |
| 2019/0045119 | A1 | 2/2019 | Stokking et al. |

OTHER PUBLICATIONS

International Search Report and Written Opinion for Int'l Application No. PCT/EP2018/080713, titled: Obtaining Image Data Of An Object In A Scene, dated Feb. 11, 2019.
Camplani, M., & L. Salgado, "Background foreground segmentation with RGB-D Kinect data: An efficient combination of classifiers," *Journal of Visual Communication and Image Representation*, 25(1): 122-136 (2014).
Caselle, Michele, et al. "Ultrafast Streaming Xamera Platform for Scientific Applications," *IEEE Transactions on Nuclear Science*, 60(5): 3669-3677 (2013).
Ochi, Daisuke, et al. "Live Streaming System for Omnidirectional Video," Virtual Reality (VR) Conference 2015, IEEE, pp. 349-350 (2015).
Samet, H. and M. Tamminen, "Efficient Component Labeling of Images of Arbitrary Dimension Represented by Linear Bintrees," *IEEE Transactions on Pattern Analysis and Machine Intelligence. IEEE.* 10(4): 579-586 (1988).
Schrey, Olaf, et al., "A 1K × 1K High Dynamic Range CMOS Image Sensor with On-Chip Programmable Region-of-Interest Readout," *IEEE Journal of Solid-State Circuits* 37(7):911-915 (2002).
Series H: Audiovisual and Multimedia Systems: Infrastructure of Audiovisual services—Coding of moving video, International Telecommunication Union, Telecommunication Standardization Sector of ITU, H.265: (Dec. 2016).
Mahy, R., et al., "Traversal Using Relays around NAT (TURN): Relay Extensions to Session Traversal Utilities for NAT (STUN)," Internet Engineering Task Force (IETF), Apr. 2010.
Lee, J-T., et al., "Stitching of Heterogeneous Images Using Depth Information", *School of Electrical Engineering*, Korea University, Seoul Korea—No date provided.
Kaheel, A., et al., "Mobicast: A System for Collaborative Event Casting Using Mobile Phones", *ACM*, Nov. 22-25, 2009.
Wang, Y., et al., "PanoSwarm: Collaborative and Synchronized Multi-Device Panoramic Photography", arXiv: 1507.01147v3 [cs. HC} Jul. 10, 2015.
Baudisch, P., et al., "Panoramic Viewfinder: Providing a Real-Time Preview to Help Users Avoid Flaws in Panoramic Pictures", *Microsoft Research*, 2005.
He, B., et al., "Panoramic Video Stitching in Multi-Camera Surveillance System", *IEEE*, 2010.
Refaat, M., et al.. "Active Feedback for Enhancing the Construction of Panoramic Live Mobile Video Streams", *IEEE*, 2011.
Wikipedia, Connected-Component Labeling, retrieved from internet URL: https://en.wikipedia.org/wiki/Connected-component_labeling, retrieved on Jul. 11, 2022.

* cited by examiner

OBTAINING IMAGE DATA OF AN OBJECT IN A SCENE

This application is the U.S. National Stage of International Application No. PCT/EP2018/080713, filed on Nov. 9, 2018, which designates the U.S., published in English, and claims priority under 35 U.S.C. § 119 or 365(c) to European Application No. 17201151.2, filed on Nov. 10, 2017. The entire teachings of the above applications are incorporated herein by reference.

FIELD OF THE INVENTION

The invention relates to a method of, and processor system configured for, obtaining image data of an object in a scene. The invention further relates to a computer program comprising instructions for causing a processor system to perform the method. The invention further relates to a processor system configured to provide the image data of the object via a network to another network entity.

BACKGROUND ART

Cameras are ubiquitous nowadays, and are included in devices such as smartphones, tablets, digital assistants, laptops, monitors, etc., or embodied as standalone devices, such as security cameras, action cameras, etc.

Various applications exist which make use of the acquired image data. A subset of these applications specifically makes use of the image data of a certain object within the captured scene. Here, the term 'captured scene' refers to the part of the physical world within the field of view of the camera and which is imaged by the camera. The object may be any object which is visible in the image data, and is typically a physical object such as a person, an animal, an art object, etc.

For example, in a video-based Virtual Reality (VR) conference, which is also referred to as 'social VR', a participant may be recorded by a camera. However, the image data which is captured by the camera not only shows the participant, but typically also the surroundings of the participant. It is typically desired to only show the participant in the VR environment, e.g., without his/her surroundings. As such, the image data may first need to be processed to separate the image data of the participant from the image data of his/her surroundings. The latter is frequently also referred to as 'background', with the object (e.g., person) being referred to as 'foreground'. Such processing may comprise applying a so-termed 'background removal' technique to the image data of the scene. Background removal is also known as foreground extraction, and may in general make use of foreground/background segmentation techniques to obtain a spatial segmentation of the object.

There are also other applications which specifically make use of the image data of a certain object within a captured scene. For example, in a security application concerned with guarding paintings in a museum, it may be desirable to monitor a specific painting, e.g., by detecting whether people enter a security perimeter surrounding the painting. However, the security camera may be positioned such that its field of view also includes a viewing area before the painting which people are allowed to enter and which is thus of less interest to the security application.

However, the entity which processes the image data for the particular application may first need to obtain all of the image data so as to have it locally available. Here, 'all of the image data' may refer to the entire image captured by the camera, e.g., corresponding to (substantially) the entire field of view of the camera. Obtaining this image data may involve receiving the image data via a bandwidth constrained link, such as an internal or external bus or a network. Disadvantageously, this may result in the bandwidth of the bandwidth constrained link being exceeded, or at least a significant part thereof being consumed. Obtaining all of the image data may also require significant storage at the entity processing the image data. Another drawback is that the processing performed by the entity, e.g., the background removal, may be applied to all of the image data, which may be computationally intensive.

SUMMARY OF THE INVENTION

It would be advantageous to be able to obtain image data of an object in a scene in a manner which addresses at least one of the abovementioned drawbacks.

In accordance with a first aspect of the invention, a method may be provided for obtaining image data of an object in a scene using a range sensor and an image sensor, wherein the range sensor and the image sensor may have a known spatial relation, the range sensor may be configured for capturing depth information of the scene, and the image sensor may be configured for capturing visible light information of the scene. The method may comprise:

obtaining a depth map of the scene acquired by the range sensor;

analyzing the depth map to identify a region of interest in the scene, wherein the region of interest contains the object;

generating selection data indicating the region of interest; and based on the selection data, selectively obtaining image data of the region of interest, wherein the image data is acquired by the image sensor.

In accordance with a further aspect of the invention, a transitory or non-transitory computer-readable medium is provided comprising a computer program. The computer program may comprise instructions for causing a processor system to perform the method.

In accordance with a further aspect of the invention, a processor system may be provided which may be configured for obtaining image data of an object in a scene using a range sensor and an image sensor, wherein the range sensor and the image sensor may have a known spatial relation, the range sensor may be configured for capturing depth information of the scene, and the image sensor may be configured for capturing visible light information of the scene. The system may comprise:

a communication interface to a bandwidth constrained link, such as a bus or a network;

a processor configured to:

via the communication interface, obtain a depth map of the scene acquired by the range sensor;

analyze the depth map to identify a region of interest in the scene which contains the object;

generate selection data indicating the region of interest; and based on the selection data and using the communication interface, selectively obtaining image data of the region of interest acquired by the image sensor.

The above measures may essentially involve using a range sensor to acquire depth information of a scene, and based on the depth information, determine a region of interest in the scene which comprises the object, and then selectively obtain the image data of the region of interest rather than all of the image data of the scene. Here, the term 'selectively obtain' may thus refer to only the image data of the region of interest being obtained, or only this image data with an insubstantial spatial margin.

Range sensors are widely used nowadays, as they become increasingly commoditized and an increasing number of applications make use of the depth information of a scene, as may be sensed by such range sensors. In many but not all cases, the depth map obtained by such a range sensor may also be used by the same application which uses the image data of the object. For example, in social VR, the depth map may be used for background removal/foreground extraction.

The inventors have devised to use such a depth map of a scene to identify where an object is located in the scene. Namely, the object may often be readily identifiable in the depth map. For example, when the object is in the physical world separated from its surroundings along the sensing direction of the range sensor, it may also be distinctly identifiable in the depth map. For example, in case of a person sitting in front of a wall, the person may be represented by depth values in the depth map which indicate a closer proximity to the range sensor compared to the representation of the wall in the depth map. As such, a region of interest may be identified in the scene which includes the object, and the image data may be selectively obtained of the region of interest, rather than of the entire scene containing the object.

This may provide one or more advantages. For example, a depth map is typically smaller in size than an image of a scene, and thus requires less bandwidth when obtained via a bandwidth constrained link, less storage space when locally stored, etc. For example, a depth map typically comprises only one channel, namely depth information, whereas a visible light image is typically acquired in color and thus may comprise three channels, e.g., R, G, B or Y, U, V. Also, a depth map may have an inherently lower spatial resolution than a visible light image, e.g., due to a lower spatial resolution of the range sensor compared to the image sensor. Nevertheless, this lower spatial resolution may still be sufficient for identifying the region of interest.

As a specific example, say the RGB sensor has a resolution of 1920×1080 pixels and the range sensor has a resolution of 512×424 pixels. Now assume the RGB sensor uses 8 bits per pixel for each color and the depth map uses 8 bits per pixel as well. One RGB frame may then use 1920× 1080×3×8=49766400 bits (roughly 6 MByte) and one depth map may use 512×424×8=1736704 bits (roughly 0.2 MByte). If the region of interest is 50% of the spatial resolution of the full sensor, using the depth map (which costs 0.2 MB) would save half of the RGB data, i.e. 3 MB. Even when not using the depth data for foreground/background segmentation, this is well worth the cost. This would be true even if the region of interest is using most of the RGB sensor, e.g. even only 10% of the RGB data falls outside the region of interest, this 10% is still 0.6 MB which is still 3 times the cost of the depth map data.

Yet another advantage is that it may be avoided that application-specific processing of the image data, such as background removal in case of social VR, needs to be applied to all of the image data. Rather, the entity processing the image data may only need to apply the processing to the image data of the region of interest. The computational complexity of this type of processing may thus be reduced, and thereby the power consumption, which in turn may result in prolonged battery life.

In the above and following, the term:

'Range sensor' may refer to a sensor, e.g., a sensing element or device, which is configured to sense depth information of a scene, which may be based on known principles including but not limited to Time-of-Flight (ToF), structured light, stereo triangulation, interferometry, etc. For example, the range sensor may be represented by a single ToF sensor, by a combination of an infrared projector and an infrared camera, by two visible light cameras arranged for stereo viewing, etc.

'Image sensor' may refer to a sensor, e.g., a sensing element or device, which is configured to sense visible light information of a scene, but which may also sense neighboring wavelengths such as infrared and UV. For example, the image sensor may be part of a camera which further comprises one or more lenses. Examples of image sensors are the ubiquitously known CCD and CMOS sensors.

'. . . have a known spatial relation' may refer to the range sensor and the image sensor imaging the same scene, e.g., a same part of the physical world, or having an overlapping field of view with respect to the physical world, in which case the overlap is known to the entity analyzing the depth map and generating the selection data. For example, such overlap may be quantified by means of a calibration, or by physically arranging the range sensor and the image sensor in a known manner.

'Depth map' may refer to an image-like data structure which contains values indicating a distance of respective locations in the field of view of the range sensor to the range sensor. The distance may be expressed as absolute depth values, e.g., in cm or meters, as relative depth values, e.g., from 0 to 1, but also by values which are indicative of said depth, e.g., by disparity values. Methods for converting between depth and disparity values are known per se to the person skilled in the art of range imaging.

'Region of interest' may be a region which is smaller than the entire image, but which is typically larger than the object. For example, the region of interest may be constituted by a bounding box or other geometric shape surrounding a detected object by a margin. A reason for the margin may be that the spatial boundaries of the object may only be coarsely rather than accurately identifiable in the depth map. Another reason for the margin may be that the region of interest may be constrained to a certain shape, e.g. a rectangle, which may encompass more image data besides the object.

'Selection data' may represent data which is indicative of the spatial location and spatial extent of the region of interest. For example, the selection data may comprise a list of coordinates defining corners of a bounding box, coordinates indicating a center and size of the bounding box, or in general an outline of a polygon. In some embodiments, in which the image data is available in a spatially segmented form, the selection data may represent an identifier of one or more spatial segments. The selection data may also represent a spatial mask, such as a binary mask in which the value '1' indicates that a pixel is part of the region of interest and '0' that it is not.

The processor system may thus for example be a camera device comprising a range sensor, e.g., a mobile phone comprising a camera and a range sensor, or a stereo-camera device in which both cameras function as a range sensor. As discussed above, the image sensor and the range sensor may have a known spatial relation, meaning the image data obtained by the image sensor and the depth map obtained by the range sensor may have a known, preferably fixed, spatial relation.

In an embodiment, the selectively obtaining the image data of the region of interest may comprise selectively receiving the image data of the region of interest via a bandwidth constrained link, such as a bus or a network. For example, the method may be performed by a processor system which is separated from the image sensor, or in general from an entity providing the image data, by a bandwidth constrained link, being, e.g., an internal bus, an external bus such as a Universal Serial Bus (USB) or a network such as a Bluetooth peer-to-peer network, a local area network and/or the Internet. As such, the bandwidth allocation of the bus or network may be reduced.

In an embodiment, the selectively obtaining the image data of the region of interest may comprise configuring the image sensor to selectively acquire the visible light information of the scene within the region of interest, and/or selectively reading out the image data of the region of interest from a memory comprised in or connected to the image sensor. In this embodiment, the image sensor may be either controllable by the entity generating the selection data, or at least accessible at a low-level, e.g., by an internal memory of the image sensor being accessible. In the former case, the image data of the region of interest may be selectively acquired by the image sensor, e.g., using techniques such as 'partial capture' as described in [2], [3] and [4] (see list of references in the detailed description). In the latter case, the scene may be entirely captured by the image sensor, but only selectively read-out from the image sensor, e.g., from a memory comprised in or directly connected to the image sensor.

In an embodiment, the image data of the scene acquired by the image sensor may be accessible by streaming from a media source via a network, and the selectively receiving the image data may comprise signaling the media source the selection data so as to request a selective streaming of the image data of the region of interest. The image data may be available via streaming from a media source, e.g., a network entity which may be embodied as a processor system and configured to function as a network-accessible source for media streams. Also here, the image data of the region of interest may be selectively obtained, namely by the selection data being signaled to the media source, which may enable the media source to selectively stream the image data of the region of interest. For example, the media source may simply selectively encode and then stream the image data of the region of interest. In another example, the image data may be available by tiled streaming, e.g., as described in [5], and the selection data may be generated to comprise an identifier of one or more tiles which comprise the image data of the region of interest. For that purpose, use may be made of spatial relationship description data which is known per se and defines a spatial relationship between different tiles available for streaming.

In accordance with a further aspect of the invention, a processor system is provided which may be configured as the media source and may comprise:
   a storage medium for at least temporary storing:
     at least one depth map of a scene which is acquired by a range sensor configured for capturing depth information of the scene
     at least one visible light image of the scene which is acquired by an image sensor configured for capturing visible light information of the scene, the image sensor having a known spatial relation with the range sensor;
   a network interface to a network comprising a bandwidth constrained link to enable the processor system to communicate with a media client;
   a processor configured to, via the network interface:
     provide the depth map to the media client;
     receive selection data from the media client which is indicative of a region of interest with respect to the scene; and
     based on the selection data, selectively transmit image data of the region of interest to the media client.

The media client may be for example an augmented reality or virtual reality rendering system, or a media rendering system such as a display device including televisions, Head Mounted Displays, VR/AR glasses, user equipment or mobile phones, tablets, laptops. In particular, a media client comprising such a display device, or a media client or media rendering system connectable to such a display device, where multiple objects or persons need to be combined in one view and/or an object or person has to be merged in a different background or surrounding, such as in a virtual conference system or any social VR system, may benefit from the present invention.

In an embodiment, the identifying the region of interest in the scene may comprise applying an object detection technique to the depth map, and/or identifying an object in the depth map on the basis of the object's depth values indicating a proximity to the depth sensor. Object detection is known per se, both in visible light images but also in depth maps, and may be based on various techniques, including heuristics and machine learning. Here, 'detect' may refer to detection of the object's spatial location within the depth map, which may be, but does not need to be, integrally combined with an explicit or implicit detection of the object's presence. Also relatively simple techniques may be used for object detection. For example, a connected set of depth values may be identified which exceed an absolute or relative threshold and thereby is presumed to represent a foreground object. The resulting mask may represent the detected object, and may be post-processed by morphological image operators.

In an embodiment, the depth map may be acquired by the range sensor at a first time instance, the selectively obtained image data may be acquired by the image sensor at a second time instance which is later in time than the first time instance, and the generating the selection data may comprise compensating for movement of the object with respect to the scene between the first time instance and at the second time instance. It may be that the selectively obtained image data is or can only be acquired at a later moment in time than the depth map from which the region of interest was determined. There may be various reasons for this. For example, the analysis of the depth map may take a certain amount of time, so if the selection data is used to acquire an image, the image will inherently be acquired at a later, second time instance. If the object remains static with respect to the scene, the selection data may also be applicable to an image which is acquired at the second time instance. However, if the object moves, the selection data may define a region of interest which does not fully contain the object anymore at the second time instance. Accordingly, one may compensate for such presumed movement of the object. For example, a margin may be added to an outline of the region of interest, and/or the spatial location of the region of interest may be adjusted based on a prediction or estimation of the movement of the object. For example, adjusting the spatial location of the region of interest based on a prediction of the movement of the object may comprise applying motion estimation to at least two depth maps acquired at different time instances to determine the movement of the object and extrapolating said movement to the second time instance. It will be appreciated that the prediction may also be performed without directly using the depth maps, e.g., if the prediction is performed based on multiple previously determined regions of interest, on the resulting foreground from multiple extracted foregrounds, etc.

It will be appreciated by those skilled in the art that two or more of the above-mentioned embodiments, implementations, and/or aspects of the invention may be combined in any way deemed useful.

Modifications and variations of any one of both processor systems, the method and the computer programs which correspond to the described modifications and variations of another one of both systems, the method and the computer program, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
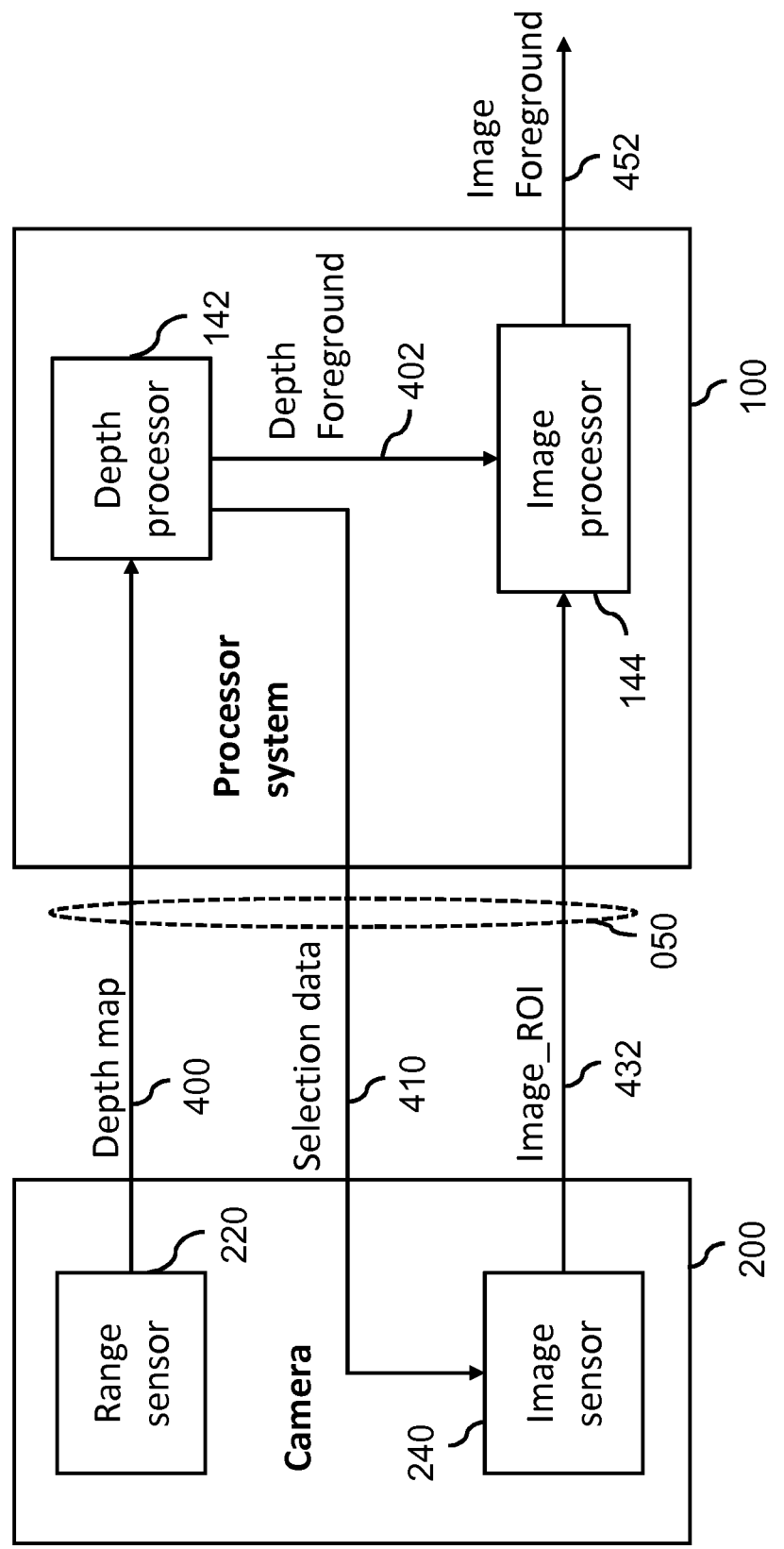
FIG. 1 shows a camera comprising a range sensor and an image sensor, and a processor system configured to analyze a depth map provided by the camera to identify a region of interest which contains an object, and to generate selection data identifying the region of interest to as to selectively obtain its image data.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

050 bandwidth constrained link
100 processor system
105 processor system configured as media client
120 communication interface
140 processor
142 depth processor
144 image processor
160 data storage
200 camera
220 range sensor
240 image sensor
300 processor system
305 processor system configured as media source
320 communication interface
340 processor
360 data storage
400 depth map
402 object mask
410 selection data
420 image
422, 424 tiled representation of image
430 region of interest
432 image data of region of interest
440 tiles representing region of interest
442-446 tile representing region of interest at different time instances
450 object
452 image data of object
500 determine ROI
502 repeated sending of depth map, determine ROI
510 remove background
512 remove background, update ROI
520 stream foreground
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments involve or relate to selectively obtaining image data of a region of interest in a scene on the basis of selection data which spatially indicates the region of interest. The selection data may be generated by analyzing a depth map of the scene, and the region of interest may be determined so as to include an object in the scene. A non-limiting example is that the object may be a person.

In the following, specific embodiments or examples are described which apply background removal/foreground extraction to the image data of the region of interest, e.g., for video-based VR conferencing, which is in more detail described under the heading 'Foreground extraction'. The object may here also be denoted as 'foreground object' or simply as 'foreground'. However, as already indicated in the introductory section, such image data of a region of interest may also be used for various other use-cases, e.g., reducing storage space when storing security video footage or reducing computational complexity when performing image enhancements. Additional embodiments pertaining to such other use-cases are well within reach of the skilled person on the basis of the present disclosure.

Processor System and Camera Embodiments

FIG. 1 shows a first embodiment in which a camera 200 is provided which comprises a range sensor 220 and an image sensor 240. Such type of camera is known per se, e.g., in the form of a Microsoft Kinect or a Razer Stargazer or Asus Zenfone AR, and may use various types of range sensors, as for example described in the summary of the invention. Alternatively to having a separate range sensor 220, the camera 200 may also comprise an additional image sensor arranged in a stereoscopic manner with the first-mentioned image sensor 240. In this example, both image sensors may together represent a range sensor 220 operating on the principle of stereoscopic triangulation.

In a specific example, the camera 200 may be a so-termed RGB-D camera having an image sensor 240 configured to acquire color image data having R, G and B color components, whereas the range sensor 220 may provide depth data comprising Depth (D) values. In the following, such color image data may be referred to as 'color image' or simply by the label 'color'. It will be understood that the color image data may also be acquired and/or obtained in any other known color format, including but not limited to YUV or HSV. Additionally, instead of three-component color image data, also any other number of components may be acquired, including one (monochromatic).

As also shown in FIG. 1, a processor system 100 may be provided which may be connected to the camera 200 via a bandwidth constrained link 050, such as an internal bus, external bus or network. The processor system 100 may be configured for obtaining, via the bandwidth constrained link 050, a depth map 400 of the scene acquired by the range sensor. The processor system 100 may comprise a depth processor 142 which may be configured for analyzing the depth map 400 to identify a region of interest in the scene, being specifically a region of interest containing a foreground object, and for generating selection data 410 indicating the region of interest. In this example, the processor system 100 may provide the selection data 410 to the camera 200, e.g., via the bandwidth constrained link 050. This may in turn cause the camera 200 to provide the image data 432 of the region of interest via the bandwidth constrained link 050 to the processor system 100. Note that multiple links, e.g., busses or networks, may together form the connection between camera and processor system. For example, a different network may be used for uplink and for downlink, or different links may be used for depth data and image data.

In a specific example, the image data 432 of the region of interest may be selectively obtained on the basis of the processor system 100 configuring the image sensor 240 to selectively acquire the visible light information of the scene within the region of interest, e.g., as described in [2] or [3]. In this example, the selection data 410 may be accompanied by control data and/or configuration data so as to effect said configuration of the image sensor 240. In another specific example, the image data 432 of the region of interest may be selectively obtained by way of the processor system 100, and in particular the image processor 144, selectively reading-out the image data 432 from a memory comprised in or connected to the image sensor 240 (not shown). In yet another example, the image sensor 240 may capture the entire scene, with the camera comprising a processor (not shown) which selectively outputs the image data 432 of the region of interest on the basis of the received selection data 410.

In accordance with the above-described use-case of video-based VR conferencing, the depth processor 142 may additionally generate a mask 402 representing the foreground object, e.g., as also described under 'Foreground extraction', and the processor system 100 may further comprise an image processor 144 which may be configured to, based on the mask 402, apply foreground extraction to the image data 432 so as to selectively obtain and output the image data 452 of the foreground object, e.g., to other participants in a video-based VR conferencing.

With further reference to FIG. 1, a specific example may be described as follows. This example also discusses the temporal relationship between the analyzed depth map and the selectively obtained image data. Here, the camera 200 may be an RGB-D camera connected through a USB connection (the bandwidth constrained link 050) to a personal computer (in short 'PC', representing the processor system 100).

The PC 100 may first retrieve a reference RGB-D image, referring to the combination of an image and a depth map acquired at substantially the same time. The PC 100 may then retrieve a stream of depth maps which may be acquired sequentially over time. Each depth map may be encoded with a timestamp or a sequence number. The PC 100 may then subtract the reference depth map from each subsequent depth map, and optionally post-process the result so as to obtain a depth mask which represents the foreground object. This depth mask is indicated as 'depth foreground' 402 in FIG. 1. The PC 100 may then determine the region of interest based on the depth mask. For example, the region of interest may be a rectangular area which encloses the foreground object while adding a margin around the foreground object. Image data of the region of interest may then be obtained from the camera 200. Such image data may correspond in time to the depth map from which the region of interest was determined, e.g., be associated with a same timestamp or sequence number. However, this may require the camera to buffer image data. Alternatively, the image data may be acquired at a later moment in time, e.g., after receiving the selection data, and thus may be associated with a later timestamp or sequence number.

Figure 2:
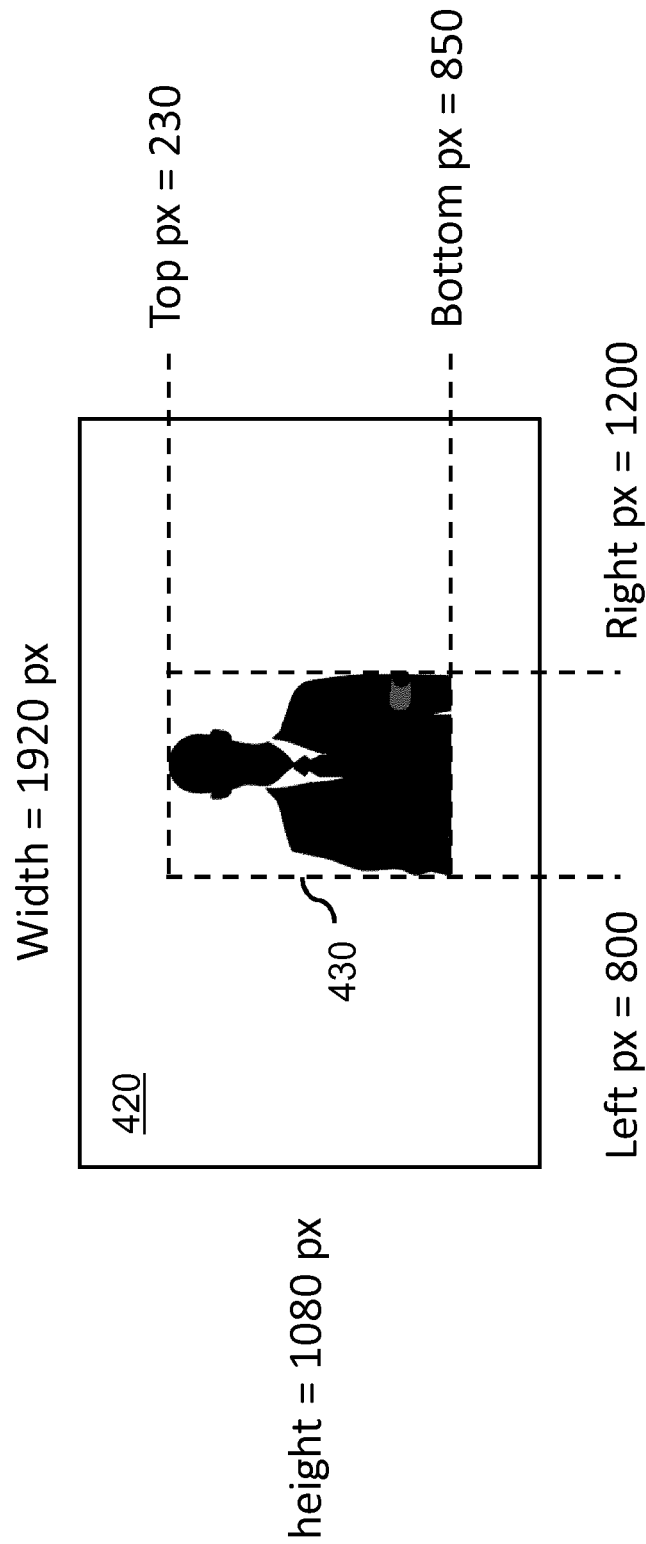
FIG. 2 shows an example of a region of interest within an image.

FIG. 2 shows an example of a region of interest 430 within an image 420, as may be spatially defined by the selection data. Here, the region of interest 430 is defined as a rectangular area between coordinates (800, 230) and (1200, 850). The object is here shown to be a person, in particular his/her upper torso and head.

Figure 3:
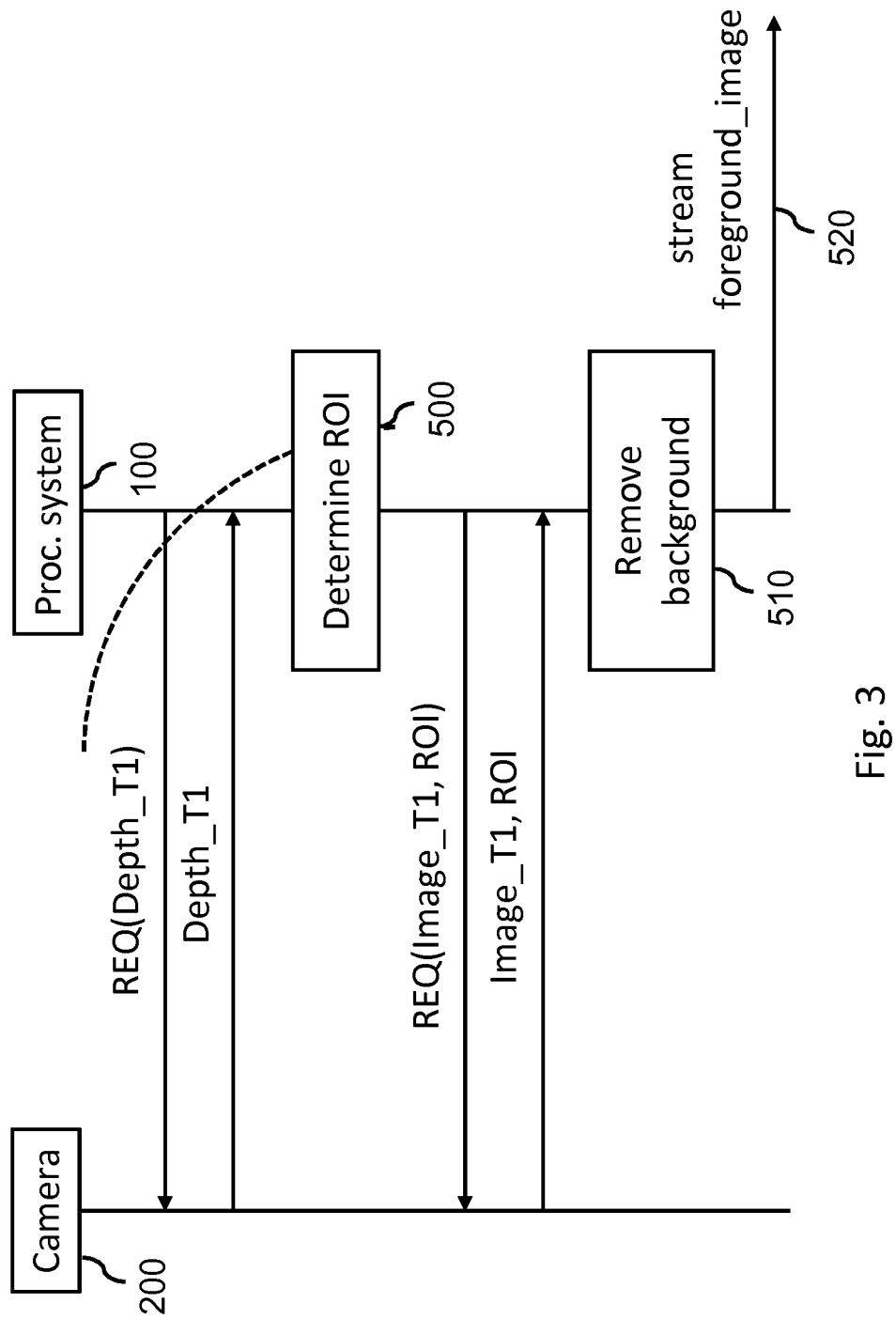
FIG. 3 shows a message exchange between the processor system and the camera so as to selectively obtain the image data of the region of interest.

FIG. 3 shows an example of a message exchange between the camera 200 and the processor system 100. This example also discusses the temporal relationship between the analyzed depth map and the selectively obtained image data. Here and in subsequent Figs. pertaining to message exchanges, the entities involved in the message exchange are represented by respective vertical lines, with horizontal arrows indicating a message exchange and the vertical axis representing a time axis.

In this example, the camera 200 may be configured or modified to support partial capture of the RGB images, e.g., it may support a region of interest (ROI)-based capture. Furthermore, the camera 200 may support the requesting of images having a certain timestamp or sequence number. The camera 200 may further be configured to buffer a number of images to allow the processor system 100 to determine the region of interest and request the image data 432 of the region of interest for a particular timestamp or sequence number. Accordingly, the processor system 100 may request a depth map acquired at time T1 with a message labeled 'REQ(Depth_T1)'. The camera 200 may respond by providing the depth map, see the arrow labeled 'Depth_T1'. The processor system 100 may then analyze the depth map to determine 500 the region of interest, see the block labeled 'Determine ROI', and based thereon request image data of the region of interest acquired at time T1 with a message labeled 'REQ(Image_T1, ROI)'. The camera 200 may respond by providing the image data of the region of interest, see the arrow labeled 'Image_T1, ROI'. The processor system 100 may then perform a background removal 510, see the block labeled 'Remove background', and stream 520 the image data of the foreground object, e.g., to another entity, see the arrow labeled 'stream foreground_image'. Such background removal may involve, e.g., replacing the background by a solid color such as green, or by setting the transparency in the background to 100%, etc.

In some embodiments, the processor system 100 may need to be aware of the spatial relationship between, on the one hand, the image data of the region of interest which was received and, on the other hand, the entire image. This information may be provided by the processor system 100 operating in a 'stateful' manner, e.g., by buffering the selection data, e.g., in association with a timestamp or sequence number. Additionally or alternatively, the camera 200 may indicate the spatial relation together with the image data, e.g., by including position metadata such as, or position metadata similar in type to, Spatial Relationship Descriptor metadata as described in [5]. This may allow the processor system 100 to match the depth data from T1 to the partial image data from T1. Another alternative is that the processor system 100 may match the image data of region of interest to the depth data, so that the depth data spatially matches the image data and foreground extraction of the object can be performed.

Media Client and Media Source Embodiments

FIGS. 1-3 relate to the image data of the region of interest being selectively acquired by and/or selectively obtained from a camera. Other types of embodiments, which are described with reference to FIGS. 4-7, relate to the image data of the region of interest being selectively obtained by a media client from a media source via a network. Here, the media source may be a media server which stores image data and depth maps, but which may not comprise or be directly connected to the image sensor and/or range sensor. Alternatively, the media source may be a device which comprises or is directly connected to the image sensor and/or range sensor, and which may make the captured image data and/or depth map(s) accessible via a network. For example, the media source may be represented by a smartphone or networked camera, and may in the context of telecommunication also be referred to as 'terminal' or 'terminal device'.

The media client may be a network node which may be configured for processing the image data obtained from the media source, e.g., to perform background removal for video-based VR conferencing, and may be configure to selectively obtain the image data of the region of interest from the media server. The media client may be located in the network, in some embodiments near the media source or near the ultimate destination of the foreground image, e.g., in an edge node such as a 5G Mobile Edge Computer (MEC).

The media client may also be, e.g., an augmented reality or virtual reality rendering system, or a media rendering system such as a display device including televisions, Head Mounted Displays, VR/AR glasses, user equipment or mobile phones, tablets, laptops. In particular, a media client comprising such a display device, or a media client or media rendering system connectable to such a display device, where multiple objects or persons need to be combined in one view and/or an object or person has to be merged in a different background or surrounding, such as in a virtual conference system or any social VR system, may benefit from the present invention.

The selective obtaining of the image data of the region of interest may comprise the media client requesting a reference depth map from the media source via the network. The media client may then request one or more depth maps from the media source so as to identify the region of interest, e.g., in a manner as described with reference to FIGS. 1-3.

Figure 4:
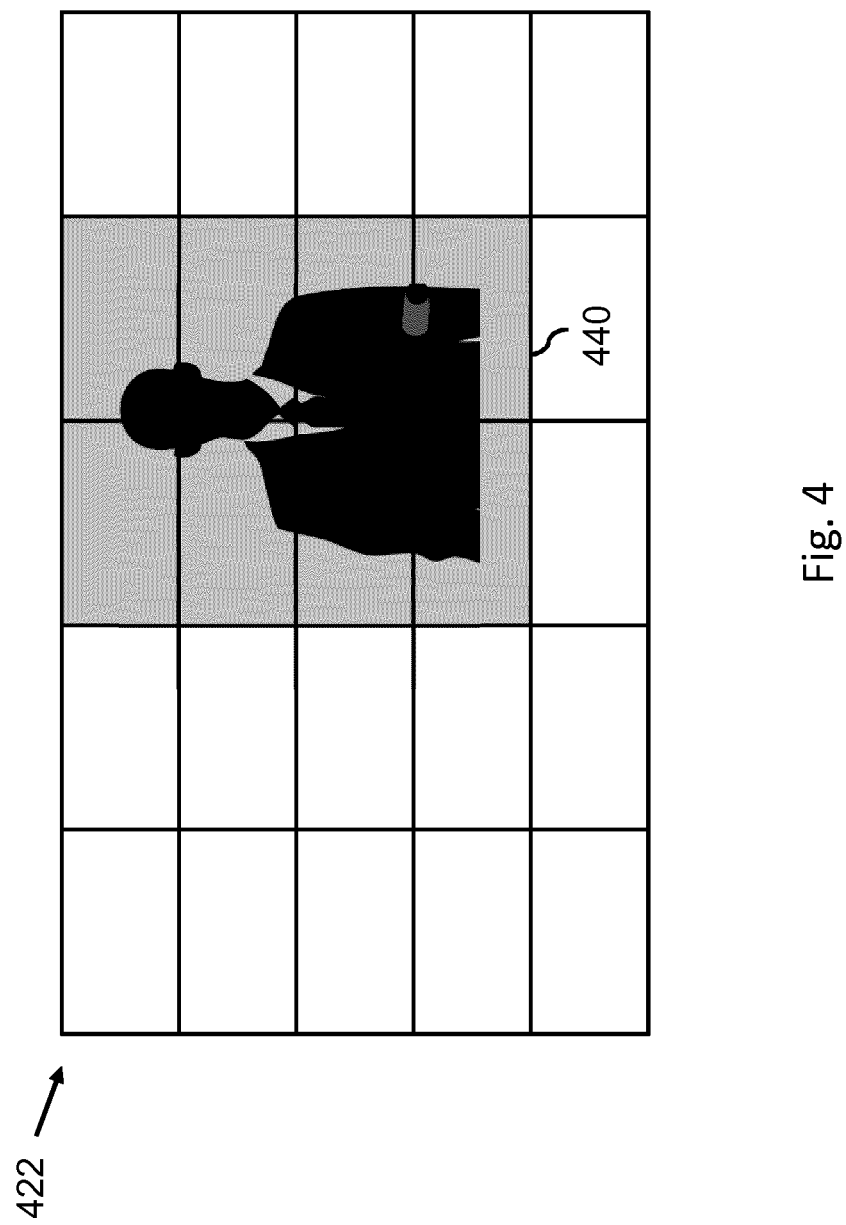
FIG. 4 shows an example of a tiled representation of an image, wherein the region of interest is represented by a subset of tiles of said tiled representation.

Having determined the region of interest, the media client may request the image data of the region of interest from the media source In the examples of FIGS. 4-7, the image data of the region of interest is provided to the media client by streaming, for example by tile-based streaming. Such tile-based or tiled streaming is known in the art, see, e.g., [5]. Briefly speaking, and as also illustrated in FIG. 4, an image may be spatially segmented in tiles 422. The spatial relationship between tiles may be described using a Spatial Relationship Description (SRD), which may be included in an MPD (Media Presentation Description). Tiles may then be requested individually. In this example, so-termed High Efficiency Video Coding (HEVC) tiles are used, in which the image is split-up in 5 rows and 5 columns, which is maximum for a full HD picture, according to current HEVC specifications [https://www.itu.int/rec/T-REC-H.265-201612-I/en]. Accordingly, each tile's size may be 384×216 pixels, thereby establishing the 25-tile representation as shown in FIG. 4.

The media client may, after determining the region of interest, map this region to a select number of tiles, or directly determine the region of interest as a select number of tiles. Having determined the select number of tiles, the selection of these tiles may be identified to the media source, e.g., in the form of selection data. Accordingly, the region of interest may be expressed as a selection of one of more of the tiles 422. For example, in the example of FIG. 4, the region of interest 440 may be represented by a 2×4 block of tiles, e.g., a selection of 8 tiles. The media source may thus stream the image data of the region of interest by streaming only the tiles 440.

Alternatively, another form of spatially segmented streaming of image data may be used, e.g., other than tile-based streaming. Yet another alternative is that the media source may simply crop or selectively encode the region of interest, e.g., in accordance with coordinates or other type of selection data provided by the media client, rather than relying on a selection of one or more predefined spatial segments. Another alternative is that all image data outside the region of interest may be replaced by one color, thereby replacing this 'outside' image data with a uniform color, which may be encoded more efficiently. Even though the data which is then transmitted may have the resolution of the original image data, the data may be encoded more efficiently thus also allows for saving bandwidth on a bandwidth constrained link.

Figure 5:
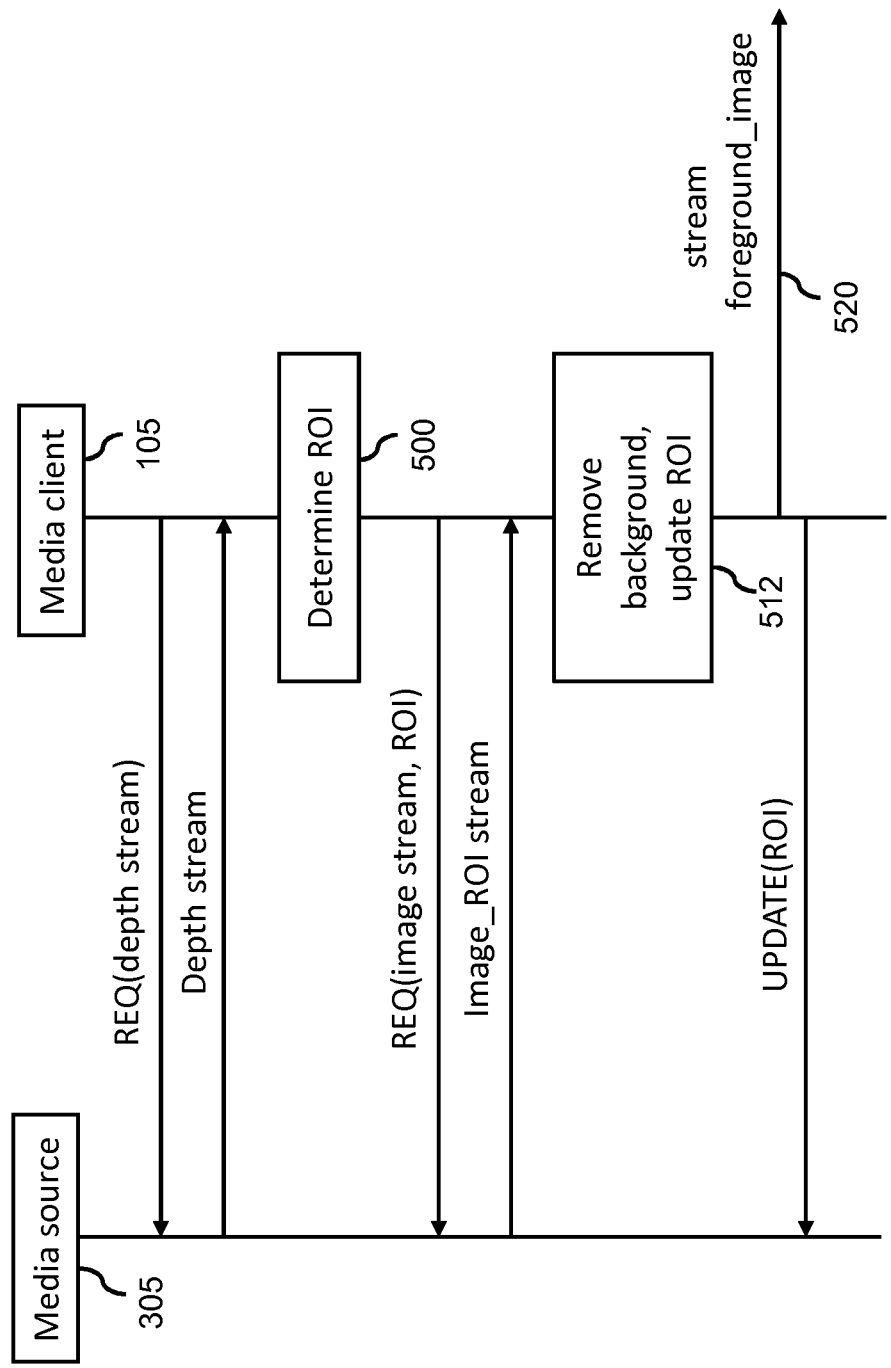
FIG. 5 shows a message exchange between a media client and a media source in which the image data of the region of interest is obtained by streaming.

FIG. 5 shows a message exchange illustrating the above-described obtaining of the image data of the region of interest by streaming. The message exchange applies to streaming, including but not limited to tile-based streaming.

In FIG. 5, the media client 105 is shown to request the media source 305 to start streaming a depth stream, e.g., a stream of depth maps, by way of a message labeled 'REQ (depth stream)'. In response, the media source 305 may stream the depth stream to the media client 105, see label 'Depth stream'. The media client 305 may then determine 500 the region of interest based on the depth stream, see the block labeled 'Determine ROI', and request an image stream on the basis of the determined region of interest by way of a message labeled 'REQ(image stream, ROI)'. In case of tile-based streaming, the message may contain a selection of one or more tiles. Alternatively, the message may contain a selection of another type of spatial segment, or simply coordinates (e.g. as in an SRD) or a mask representing the region of interest, etc. In response, the media source 305 may stream the image data of the region of interest, see label 'Image_ROI stream'. The media client 105 may then perform background removal 512, see the block labeled 'Remove background', and stream 520 the image data of the foreground object, e.g., to another entity, see the label 'stream foreground_image'.

In a continuous or semi-continuous process, the media client 105 may monitor the region of interest based on one or more later received depth maps of the depth stream. If the object starts moving, the media client 105 may update 512 the definition of the region of interest, as also shown by the label 'update ROI' following the 'Remove background'. This may result in an update of the selection data, which may be provided to the media source 305 directly or in another form, see the arrow labeled 'UPDATE(ROI)'. In case of tile-based streaming, this may cause the media source 305 to stop streaming one or more tiles and start streaming one or more other tiles. When performing streaming by some form of HTTP Adaptive Streaming, such as DASH or HLS, the client may request the streaming by continuously requesting small segments in time of the entire stream. The requesting of a certain region of interest may then be performed by requesting this region of interest for certain segments, and the updating of the region of interest may be performed by simply requesting other spatial parts of segments, e.g. using a tiled streaming based approach.

In the example of FIG. 5 and others, a depth map may be used for determining the region of interest, but also to remove the background in the received image data of the region of interest. In some embodiments, the first one or more depth maps may be used solely to determine the region of interest. Once the image data of the region of interest is received, the background removal may then start.

In some embodiments, depth maps and images may be transmitted together. In these embodiments, it is not needed to make use of sequence numbers or timestamps, since each depth map is directly linked to its accompanying image. In such embodiments, a depth map may, on the one hand, be used to determine the region of interest in 'future' images since it serves as a basis for a subsequent request of image data of the region of interest. The region of interest may thus effectively represent a prediction of the location of the object. On the other hand, the depth map may be used to remove the background in the 'current' image data of the region of interest.

The example of FIG. 5 is based on a 'pull' mechanism, in that the media client 105, e.g., a network node, requests data from the media source 305, e.g., a terminal. Instead of a pull model, also a 'push' mechanism may be used, in that the media source may 'push' data and/or instructions to the media client.

Figure 6:
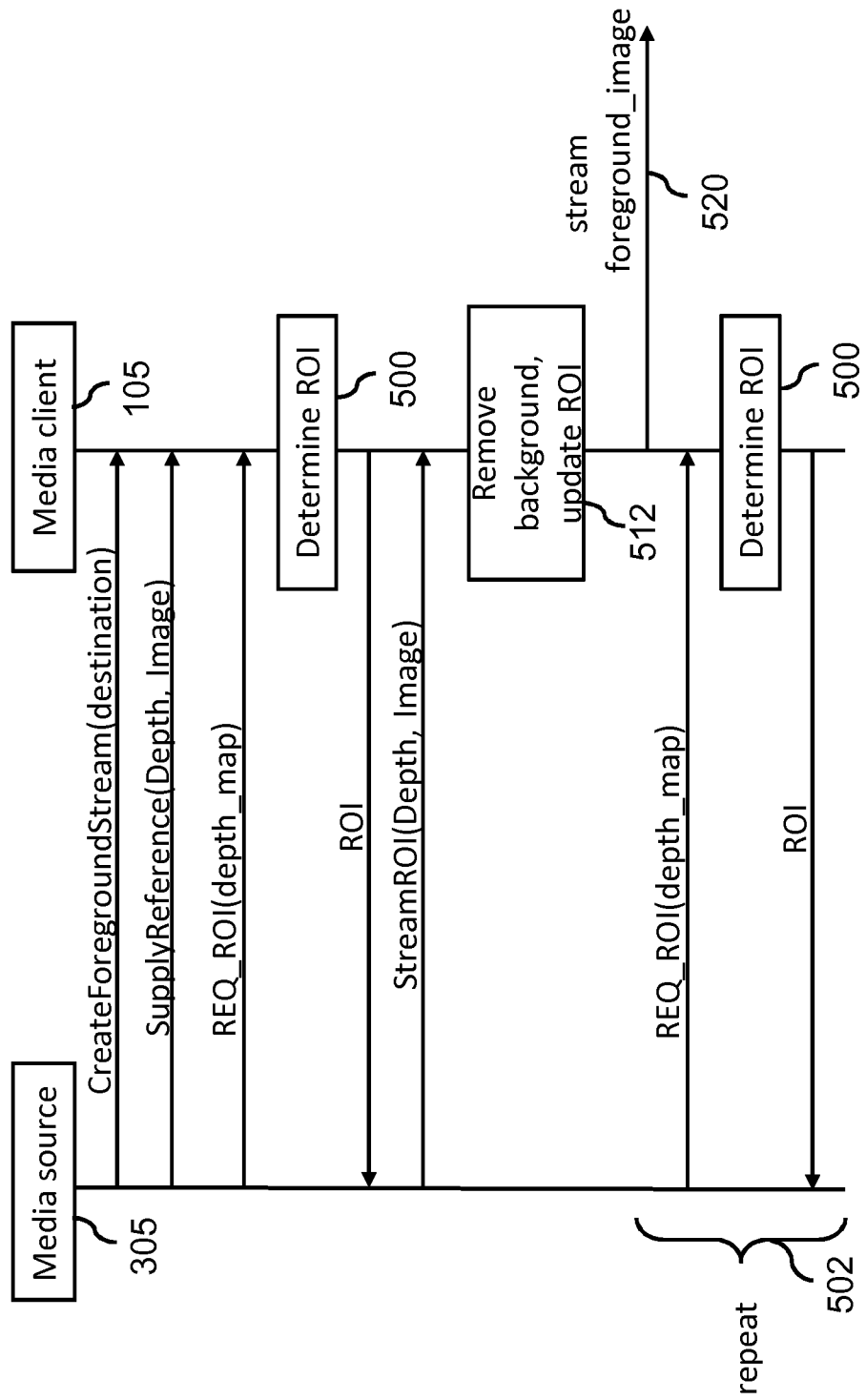
FIG. 6 shows a message exchange between a media client and a media source in which the media source 'pushes' data and instructions to the media client.

FIG. 6 shows an example of such a 'push' mechanism, in which the media source 305 may instantiate a function on the media client 105 to assist the media source with establishing the push mechanism. Firstly, the media source 305 may instruct the media client 105 to establish a stream of the image data of a foreground object to a particular network destination, as shown in FIG. 6 by a message labeled 'CreateForegroundStream(destination)'. The destination may, for example, be specified by a destination address, port number and protocol to use. For this purpose, TURN (IETF RFC 5766 Traversal Using Relays around NAT) may be used, or at least the principles of TURN, as TURN typically allows a client (here the media source) to instruct a relay server (here the media client) to allocate a part for relaying a stream, in which the client can instruct the server to bind a channel to a certain destination peer.

The media client 105 may subsequently be provided with a reference comprising the depth map and optionally an image, as shown in FIG. 6 by a message labeled 'SupplyReference(Depth, Image)'. Next, the media source 305 may send a depth map to the media client 105 and request the media client to specify a region of interest, see the message labled 'REQ_ROI(depth_map)'. Such specification of the region of interest may take any suitable form as previously discussed with reference to the selection data. In this particular example, the SRD from DASH [5] may be used to describe a rectangular region of interest. For example, the entire image may be divided in 16×9 tiles (horizontal× vertical), and the media client may determine 500 the region of interest to correspond to the tiles from (8,4) to (9,5), e.g., a section of 2×2 tiles having as their upper-leftmost corner (8,4), see the label 'Determine ROI' in FIG. 6.

The media client 105 may send a specification of the region of interest, see the message labeled 'ROI', e.g., in the form of selection data comprising the string (0, 8, 4, 2, 2, 16, 9), which may be defined in accordance with the below syntax:

| Property name | Property value | Comments |
| --- | --- | --- |
| source_id | 0 | Unique identifier for the source of the content, to show what content the spatial part belong to |
| object_x | 8 | x-coordinate of the upper-left corner of the tile |
| object_y | 4 | y-coordinate of the upper-left corner of the tile |
| object_width | 2 | Width of the tile |
| object_height | 2 | Height of the tile |
| total_width | 16 | Total width of the content |
| total_height | 9 | Total height of the content |

After the specification of the region of interest is received by the media source 305, the media source may selectively stream the image data of the region of interest, while optionally, also the depth values in the region of interest may be selectively streamed, e.g., instead of all of the depth map, see label 'StreamROI(Depth, Image)'. The media client 105 may then perform background removal and update 512 the requested ROI, see the block labeled 'Remove background, update ROI', and stream 520 the image data of the foreground object, e.g., to another entity, see the arrow labeled 'stream foreground_image'. In the example of FIG. 6, the media source 305 is also shown to regularly send an entire depth map to the media client to update the ROI, see accolade 502 representing a repeat of 'REQ_ROI(depth_map)' and 'ROI'. This may facilitate the object detection, as in some cases, e.g., in case of large or erratic movement, the object may not be (fully) shown in the depth values which are currently available to the media client from a region of interest in a previous depth map.

In general, there exist various alternatives to the push mechanism illustrated in FIG. 6. For example, the entire depth maps may be streamed continuously, and a Subscribe/Notify principle may be used to receive updates on the selection of the region of interest by the media client. This may avoid the situation that the object is not (fully) shown in the depth values currently available to the media client. The image data may nevertheless still be streamed selectively, e.g., within the region of interest.

Another alternative is to stream only the image data and depth values within the region of interest, and use prediction to adjust the region of interest over time. Again, a Subscribe/Notify principle may be used to receive region of interest updates, as the region of interest may be predicted on the media client.

Yet another alternative is that the media client may continuously send the spatial location of the detected object to the media source, e.g., as coordinates. The media source may then perform the aforementioned prediction and determine within which region of interest the image data is to be streamed to the media client.

Figure 7:
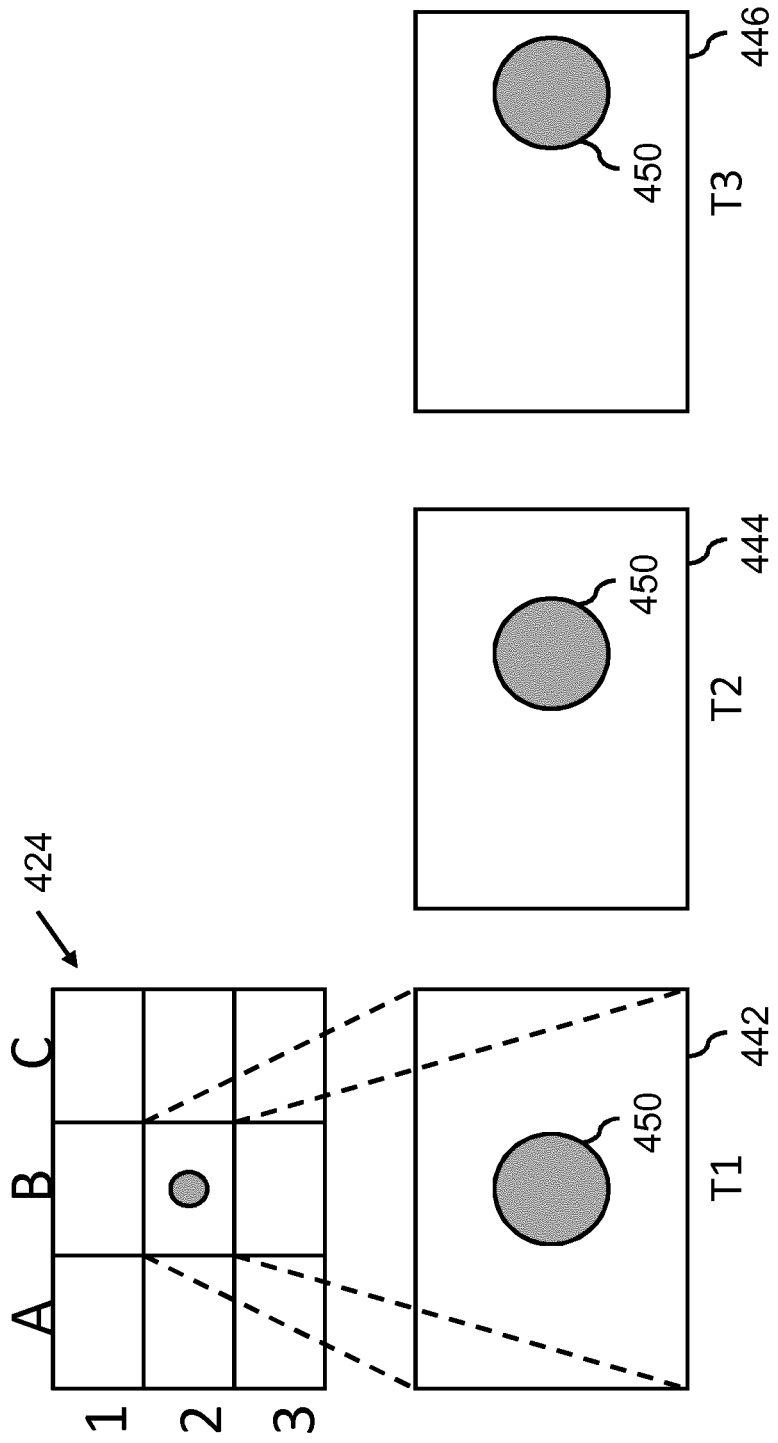
FIG. 7 illustrates prediction of object movement.

FIG. 7 illustrates the prediction of object movement within the context of tile-based streaming, which is illustrated by a tile-based representation 424 of an image which is divided in 9 regions labeled A1 to C3. A foreground object is shown in the center at time T1 442, located in the center of region B2. This foreground object may move towards the right, as shown for T2 444 and T3 446. If this movement is extrapolated, the foreground object is expected to move from region B2 to C2. In this case, the region of interest may include only region B2 at the start, but after T3 may be extended to include C2 as well. If the foreground object were to continue moving to the right and entirely arrive in region C2, then B2 may be omitted from the region of interest. Such movement, and thus also its prediction, may in general also be horizontal, vertically or diagonal, and vary in speed and acceleration/deceleration.

Foreground Extraction

The following discusses how to perform background removal/foreground extraction, which may in some embodiments be applied to the selectively obtained image data of the region of interest, e.g., for video-based VR conferencing. Various such techniques are known, e.g., from the fields of image analysis, image processing and computer vision [1]. A specific example is that foreground extraction may involve a reference being captured first without the foreground object, with the reference comprising a depth map and optionally a visible-light image. For subsequent depth maps, which may now show the foreground object, the reference depth map may be subtracted from a current depth map, thereby obtaining an indication of the foreground object in the form of depth values having (significant) non-zero values. This subtraction result is henceforth also simply referred to as foreground depth map.

However, the result of the subtraction may be noisy. For example, there may be 'holes' in the region of the foreground depth map corresponding to the foreground object. The result may therefore be post-processed using known techniques. For example, 1) zero and negative values may be replaced by higher values, 2) only pixels with depth values in a desired range—which may be a dynamic range—may be selected as foreground, and 3) the holes may be filled using erosion and dilation operations.

Of course, not all objects appearing in the subtraction result may correspond to the desired 'foreground' object, as there may be other objects which have entered, left or changed their location with respect to the scene. Therefore, a connected components analysis [6], [7] may be performed which enables distinguishing between, e.g., objects 'person' and 'desk', albeit non-semantically. Objects in the foreground depth map may thus be addressed individually and included or excluded from the region of interest as desired. Alternatively, semantic object labeling [8] may be used but this may be limited to prior (training) information and a limited number of classes. It is noted that connected component analysis and similar techniques may allow compensating for a moving background, e.g., due to a camera pan or actual movement of the background, namely by allowing a specific object in the scene to be selected.

The region of interest may now be determined, for example as a bounding box or similar geometric construct around the object of interest in the foreground depth map. Alternatively, the foreground depth map may be directly used as a mask representing the foreground object, and thus the region of interest. This may work best when a pixel-to-pixel mapping between the depth map and the image exists. If this is not the case, a correction step for this mapping may be needed, which may comprise warping the depth map on the image, for example using a feature-based homography computation. This way, also affine transformations may be taken into account which may result in a more accurate selection of the object. The mask may be used to selectively read-out the image sensor, read-out a memory connected to the image sensor or in general to selectively obtain the image data of the region of interest.

General Remarks

In general, the term 'obtaining' may refer to 'receiving' and the term 'providing' may refer to 'sending', e.g., via an internal bus, external bus or a network.

Instead of a range sensor yielding a depth map, also a heat sensor may be used which yields a heat map and which may be used to select a region of interest containing an object on the basis of a heat signature of the object. Any reference to 'depth', as adjective or noun, may thus instead be read as 'heat', mutatis mutandis.

In addition to the depth map, also image data may be used to select the region of interest. This may enable a more accurate selection of the region of interest. For example, updates of the region of interest, e.g., to accommodate a change in spatial location of the object with respect to the scene and/or the image sensor, may be determined based on depth data and/or image data.

The region of interest may be defined in any manner known per se, e.g., as a bounding box, but also by a non-rectangular shape, e.g. using geometric forms, using a formula, using a 'negative' description of what is not part of the region, etc.

Once an initial region of interest has been determined, the depth map may now also be selectively obtained, e.g., as depth values within the region of interest. To allow for object movement, motion prediction and/or a spatial margin may be used.

The foreground extraction may, in some embodiments, not make use of the depth map, but rather use, e.g., a 'subtraction' image between a reference image which does not contain the object and a later image containing the object. In such embodiments, the depth map may be low-resolution as it is only or predominately used to identify the region of interest, but not for extracting the actual foreground.

The image sensor may be a CMOS sensor configured for partial capture.

The range sensor and the image sensor may be combined in one device, but may also be separately provided but spatially and temporally aligned.

For a moving camera or moving background, the reference depth map and/or image may be continuously updated so as to allow foreground extraction from the depth map and/or image.

When the object is not moving for a certain period, the depth map may be retrieved only every X frames, e.g. every other frame, every 10 frames, etc.

If there is a difference in resolution, viewpoint or perspective between the depth map and the image, a spatial mapping may be used to map one to the other.

Timestamps or sequence numbers may be omitted if the depth map and the accompanying image are transmitted together, e.g. in an MPEG-TS.

If only the region of interest of the image is outputted, e.g., as in the case of streaming to a video-based VR conference, the coordinates of the region of interest may be indicated in the stream, e.g., as metadata, so that if an object is moving but due to an update of the region of interest appears static in the streamed image data, the image data may be displayed appropriately, e.g., also in a moving manner.

In some embodiments, the selection data may be provided, e.g., as a signal or as data stored on a transitory or non-transitory computer readable medium.

In some embodiments, a camera may be provided which may comprise a visible light image sensor and optionally a range sensor. The camera may be configured for enabling selective capture or selective read-out from a memory of image data of a region of interest as defined by the selection data described in this specification. Additionally or alternatively, the camera may comprise a processor configured to selectively output said image data on the basis of the selection data.

Processor Systems

Figure 8:
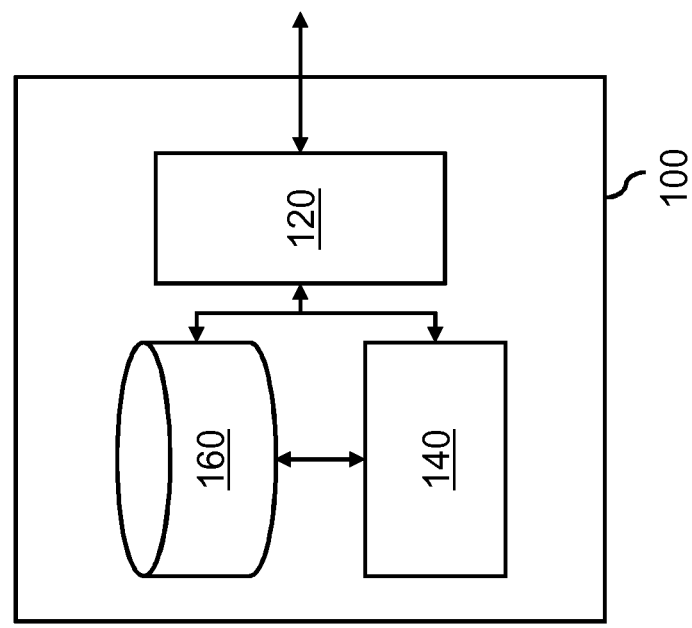
FIG. 8 provides an overview of the sender system.

FIG. 8 shows a more detailed view of a processor system 100 which may be configured for analyzing the depth map to identify a region of interest in the scene and generating selection data. The processor system 100 of FIG. 8 may correspond to the processor system 100 described with reference to FIGS. 1 and 3 and others, and/or to the media client 105 as described with reference to FIGS. 5 and 6 and others.

The processor system 100 is shown to comprise a communication interface 120 for obtaining a depth map of a scene acquired by a range sensor, and for selectively obtaining image data of the region of interest. For example, the communication interface may be a communication interface to an internal bus or an external bus such as a Universal Serial Bus (USB) via which the range sensor and/or the image sensor may be accessible. Alternatively, the communication interface may be a network interface, including but not limited to a wireless network interface, e.g., based on Wi-Fi, Bluetooth, ZigBee, 4G mobile communication or 5G mobile communication, or a wired network interface, e.g., based on Ethernet or optical fiber. In this case, the processor system 100 may access the depth map and the image data via the network, e.g., from a media source such as that shown in FIG. 9. For example, the network interface may be a local area network (LAN) network interface, but may also be a network interface to a wide area network (WAN), e.g., the Internet.

FIG. 8 further shows the processor system 100 comprising a data storage 160, such as internal memory, a hard disk, a solid-state drive, or an array thereof, which may be used to buffer data, e.g., the depth map and the image data of the region of interest. The processor system 100 may further comprise a processor 140 which may be configured, e.g., by hardware design or software, to perform the operations described with reference to FIGS. 1, 3, 5, 6 and others, e.g., at least in as far as pertaining to the analyzing of the depth map to identify a region of interest in the scene, and to the subsequent generating of the selection data. For example, the processor 140 may be embodied by a single Central Processing Unit (CPU), but also by a combination or system of such CPUs and/or other types of processing units.

The processor system 100 may be embodied by a (single) device or apparatus. For example, the processor system 100 may be embodied as smartphone, personal computer, laptop, tablet device, gaming console, set-top box, television, monitor, projector, smart watch, smart glasses, media player, media recorder, etc., and may in the context of telecommunication also be referred to as 'terminal' or 'terminal device'. The processor system 100 may also be embodied by a distributed system of such devices or apparatuses. An example of the latter may be the functionality of the processor system 100 being distributed over different network elements in a network.

Figure 9:
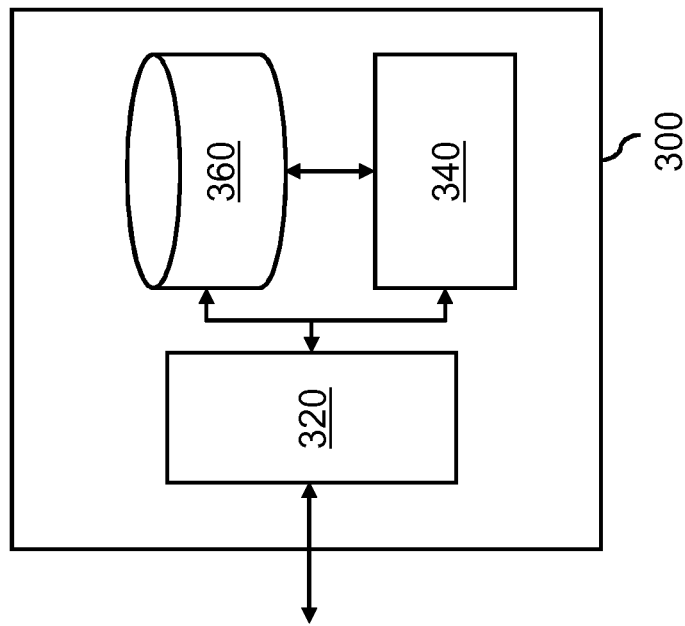
FIG. 9 provides an overview of the rendering system.

FIG. 9 shows a more detailed view of a processor system 300 which may be configured as media source. The processor system 300 of FIG. 9 may correspond to the media source 305 as described with reference to FIGS. 5 and 6 and others.

It can be seen that the processor system 300 comprises a network interface 320 for communicating with the processor system 100 as described in FIG. 8. The network interface 320 may take any suitable form, including but not limited to those described with reference to the network interface 120 of the processor system 100 of FIG. 8.

The processor system 300 may further comprise a processor 340 which may be configured, e.g., by hardware design or software, to perform the operations described with reference to FIGS. 5 and 6 and others in as far as pertaining to the media source. The processor 340 may be embodied by a single Central Processing Unit (CPU), but also by a combination or system of such CPUs and/or other types of processing units. The processor system 300 may further comprise a storage medium 360 for at least temporary storing at least one depth map of a scene, and/or at least one visible light image of the scene. The storage medium 360 may take any suitable form, including but not limited to those described with reference to the storage medium 160 of the processor system 100 of FIG. 8.

The processor system 300 may be embodied by a (single) device or apparatus. The processor system 300 may also be embodied by a distributed system of such devices or apparatuses. An example of the latter may be the functionality of the processor system 300 being distributed over different network elements in a network. In a specific example, the processor system 300 may be embodied by a network node, such as a server or an edge node such as a 5G Mobile Edge Computer (MEC).

In general, the processor system 100 of FIG. 8 and the processor system 300 of FIG. 9 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium, e.g., in the form of a series of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Figure 10:
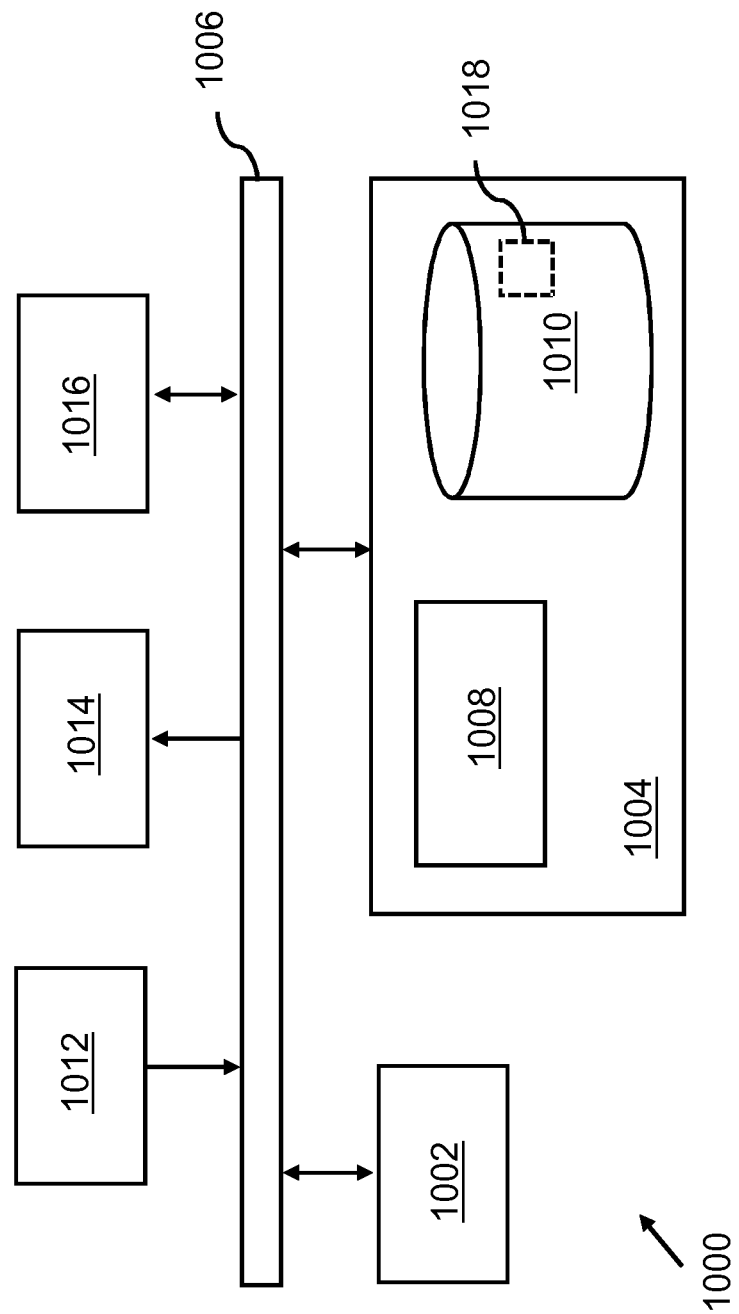
FIG. 10 shows an exemplary data processing system.

FIG. 10 is a block diagram illustrating an exemplary data processing system that may be used in the embodiments described in this specification. Such data processing systems include data processing entities described in this specification, including but not limited to the processor systems, the media client, media source, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent one of the entities indicated by numerals 100, 105, 300, 305 in this specification, e.g., a processor system, media source or media client. In that case, application 1018 may represent an application that, when executed, configures data processing system 1000 to perform the functions described herein with reference to said entity.

REFERENCES

[1] Camplani, M., & Salgado, L. (2014). Background foreground segmentation with RGB-D Kinect data: An efficient combination of classifiers. Journal of Visual Communication and Image Representation, 25(1), 122-136.

[2] Caselle, Michele, et al. "Ultrafast streaming camera platform for scientific applications." IEEE Transactions on Nuclear Science 60.5 (2013): 3669-3677.

[3] Schrey, Olaf, et al. "A 1 K/spl times/1 K high dynamic range CMOS image sensor with on-chip programmable region-of-interest readout." IEEE Journal of Solid-State Circuits 37.7 (2002): 911-915.

[4] Barber, Charles P., et al. "Reading apparatus having partial frame operating mode." U.S. Pat. No. 8,702,000. 22 Apr. 2014.

[5] Ochi, Daisuke, et al. "Live streaming system for omnidirectional video" Virtual Reality (VR), 2015 IEEE.

[6] https://en.wikipedia.org/wiki/Connected-component_labeling

[7] Samet, H.; Tamminen, M. (1988). "Efficient Component Labeling of Images of Arbitrary Dimension Represented by Linear Bintrees". IEEE Transactions on Pattern Analysis and Machine Intelligence. IEEE. 10 (4): 579. doi:10.1109/34.3918.

[8] Camplani, M., & Salgado, L. (2014). Background foreground segmentation with RGB-D Kinect data: An efficient combination of classifiers. Journal of Visual Communication and Image Representation, 25(1), 122-136.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, the method comprising:
   obtaining a depth map of the scene acquired by the range sensor;
   analyzing the depth map to identify a region of interest in the scene, wherein the region of interest contains the object;

generating selection data indicating the region of interest; and based on the selection data, selectively obtaining image data of the region of interest, wherein the image data is acquired by the image sensor and the image data of the scene acquired by the image sensor is accessible by streaming from a media source via a network, and wherein the selectively obtaining the image data of the region of interest comprises signalling the media source the selection data so as to request a selective streaming of the image data of the region of interest.

2. The method according to claim 1, wherein the selectively obtaining the image data of the region of interest comprises selectively receiving the image data of the region of interest via a bandwidth constrained link, such as a bus or a network.

3. The method according to claim 1, wherein the selectively obtaining the image data of the region of interest comprises:

configuring the image sensor to selectively acquire the visible light information of the scene within the region of interest; and/or selectively reading-out the image data of the region of interest from a memory comprised in or connected to the image sensor.

4. The method according to claim 1, wherein:

the image data of the scene acquired by the image sensor is accessible by tile-based streaming from the media source via the network; and the selection data is generated to comprise an identifier of one or more tiles which comprise the image data of the region of interest, wherein said selection data is generated on the basis of spatial relationship description data defining a spatial relationship between different tiles available for streaming.

5. The method according to claim 1, wherein the identifying the region of interest in the scene comprises:

applying an object detection technique to the depth map; and/or identifying an object in the depth map on the basis of the object's depth values indicating a proximity to the depth sensor.

6. The method according to claim 1, further comprising applying a background removal technique to the image data of the region of interest so as to remove a background surrounding the object in the image data.

7. A non-transitory computer-readable medium comprising a computer program, the computer program comprising instructions for causing a processor system to perform the method according to claim 1.

8. A method of obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, the method comprising:

obtaining a depth map of the scene acquired by the range sensor;

analyzing the depth map to identify a region of interest in the scene, wherein the region of interest contains the object, wherein the identifying the region of interest in the scene comprises:

obtaining a first depth map of the scene acquired by the range sensor when the object is not present;

obtaining a second depth map of the scene acquired by the range sensor when the object is present; and identifying the region of interest in the scene based on a comparison of the first depth map and the second depth map;

generating selection data indicating the region of interest and based on the selection data, selectively obtaining image data of the region of interest, wherein the image data is acquired by the image sensor.

9. The method according to claim 8, wherein the selectively obtaining the image data of the region of interest comprises selectively receiving the image data of the region of interest via a bandwidth constrained link, such as a bus or a network.

10. The method according to claim 8, wherein the selectively obtaining the image data of the region of interest comprises:

configuring the image sensor to selectively acquire the visible light information of the scene within the region of interest; and/or selectively reading-out the image data of the region of interest from a memory comprised in or connected to the image sensor.

11. The method according to claim 8, wherein the identifying the region of interest in the scene comprises:

applying an object detection technique to the depth map; and/or identifying an object in the depth map on the basis of the object's depth values indicating a proximity to the depth sensor.

12. The method according to claim 8, further comprising applying a background removal technique to the image data of the region of interest so as to remove a background surrounding the object in the image data.

13. A non-transitory computer-readable medium comprising a computer program, the computer program comprising instructions for causing a processor system to perform the method according to claim 8.

14. A method of obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, the method comprising:

obtaining a depth map of the scene acquired by the range sensor, wherein the depth map is acquired by the range sensor at a first time instance;

analyzing the depth map to identify a region of interest in the scene, wherein the region of interest contains the object;

generating selection data indicating the region of interest, wherein the generating selection data comprises compensating for movement of the object with respect to the scene between the first time instance and a second time instance which is later in time than the first time instance; and based on the selection data, selectively obtaining image data of the region of interest, wherein the image data is acquired by the image sensor, and wherein the selectively obtained image data is acquired by the image sensor at the second time instance.

15. The method according to claim 14, wherein said compensating for the movement of the object comprises at least one of:

adding a margin to an outline of the region of interest; and
adjusting a spatial location of the region of interest based on a prediction of the movement of the object, for example:
by applying motion estimation to at least two depth maps acquired at different time instances to determine the movement of the object and extrapolating said movement to the second time instance.

16. The method according to claim 14, wherein the selectively obtaining the image data of the region of interest comprises selectively receiving the image data of the region of interest via a bandwidth constrained link, such as a bus or a network.

17. The method according to claim 14, wherein the selectively obtaining the image data of the region of interest comprises:
configuring the image sensor to selectively acquire the visible light information of the scene within the region of interest; and/or
selectively reading-out the image data of the region of interest from a memory comprised in or connected to the image sensor.

18. The method according to claim 14, wherein the identifying the region of interest in the scene comprises:
applying an object detection technique to the depth map; and/or
identifying an object in the depth map on the basis of the object's depth values indicating a proximity to the depth sensor.

19. The method according to claim 14, further comprising applying a background removal technique to the image data of the region of interest so as to remove a background surrounding the object in the image data.

20. A non-transitory computer-readable medium comprising a computer program, the computer program comprising instructions for causing a processor system to perform the method according to claim 14.

21. A processor system configured for obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, wherein the image data of the scene acquired by the image sensor is accessible by streaming from a media source via a network, and the processor system comprising:
a communication interface, wherein the communication interface is a network interface to the network comprising a bandwidth constrained link;
a processor configured to:
via the communication interface, obtain a depth map of the scene acquired by the range sensor;
analyze the depth map to identify a region of interest in the scene which contains the object;
generate selection data indicating the region of interest; and
based on the selection data and using the communication interface, signal the media source a spatial location of the region of interest so as to request a selective streaming of the image data of the region of interest and selectively obtain image data of the region of interest from the media source.

22. The processor system according to claim 21, wherein:
the processor system comprises and is connected to the range sensor and the image sensor via the communication interface and an internal bus, or
the processor system is connected to the range sensor and the image sensor via the communication interface and an external bus.

23. The processor system according to claim 22, wherein the processor is configured to, via the communication interface:
configure the image sensor to selectively acquire the visible light information of the scene within the region of interest; and/or
selectively read-out the image data of the region of interest from a memory comprised in or connected to the image sensor.

24. A processor system configured as a media source and comprising:
a storage medium for at least temporary storing:
at least one depth map of a scene which is acquired by a range sensor configured for capturing depth information of the scene;
at least one visible light image of the scene which is acquired by an image sensor configured for capturing visible light information of the scene, the image sensor having a known spatial relation with the range sensor;
a network interface to a network comprising a bandwidth constrained link to enable the processor system to communicate with a media client, wherein image data of the scene acquired by the image sensor is accessible by streaming from the media source to the media client via the network;
a processor configured to, via the network interface:
provide the depth map to the media client;
receive selection data from the media client which is indicative of a region of interest with respect to the scene; and
based on the selection data, selectively stream the image data of the region of interest to the media client.

25. A processor system configured for obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, and the processor system comprising:
a communication interface to a bandwidth constrained link, such as a bus or a network;
a processor configured to:
via the communication interface, obtain a depth map of the scene acquired by the range sensor;
analyze the depth map to identify a region of interest in the scene which contains the object, wherein the identifying the region of interest in the scene comprises:
obtaining a first depth map of the scene acquired by the range sensor when the object is not present;
obtaining a second depth map of the scene acquired by the range sensor when the object is present; and
identifying the region of interest in the scene based on a comparison of the first depth map and the second depth map;
generate selection data indicating the region of interest; and
based on the selection data and using the communication interface, selectively obtain image data of the region of interest acquired by the image sensor.

26. A processor system configured for obtaining image data of an object in a scene using a range sensor and an image sensor, wherein the range sensor and the image sensor have a known spatial relation, the range sensor is configured for capturing depth information of the scene, the image sensor is configured for capturing visible light information of the scene, and the processor system comprising:
- a communication interface to a bandwidth constrained link, such as a bus or a network;
- a processor configured to:
- via the communication interface, obtain a depth map of the scene acquired by the range sensor at a first time instance;
- analyze the depth map to identify a region of interest in the scene which contains the object;
- generate selection data indicating the region of interest comprising compensation for movement of the object with respect to the scene between the first time instance and a second time instance which is later in time than the first time instance; and
- based on the selection data and using the communication interface, selectively obtain image data of the region of interest acquired by the image sensor at a second time instance.

* * * * *